United States Patent

[11] 3,575,462

[72] Inventor William C. Riester
Williamsville, N.Y.
[21] Appl. No. 870,980
[22] Filed Aug. 15, 1969
[45] Patented Apr. 20, 1971
[73] Assignee Trico Products Corporation
Buffalo, N.Y.
Division of Ser. No. 662,934, Aug. 24, 1967,
Pat. No. 3,516,704

[54] LATCH RELEASE SYSTEM
5 Claims, 7 Drawing Figs.
[52] U.S. Cl.................................................. 296/65,
296/111, 297/379
[51] Int. Cl............................................... B60r 21/00
[50] Field of Search....................................... 296/65, 65
(.1); 297/379; 180/82, 113, 111

[56] References Cited
UNITED STATES PATENTS
2,815,796 12/1957 Lobanoff...................... 296/65(.1)UX

| 2,927,655 | 3/1960 | Leslie et al.................. | 180/82 |
| 3,119,477 | 1/1964 | Ryder........................... | 180/82UX |
| 3,444,949 | 5/1969 | Pollock........................ | 296/65 |

Primary Examiner—Benjamin Hersh
Assistant Examiner—John A. Pekar
Attorney—E. Herbert Liss ABSTRACT: A motor vehicle having a seat back pivotal relative to the seat with a latch for preventing relative pivotal movement between the seat and seat back. A remote controlled latch actuator system includes a fluid pressure differential energized servo unit supplied by a bellows type pump or vacuum from the intake manifold through a remotely disposed valve assembly, either solenoid operated or mechanically operated, in response to opening or closing of a vehicle door for supplying fluid pressure to the servo unit. A single door switch operates a courtesy light and the solenoid valve. A diode separates the manual courtesy light switch form the door switch circuit.

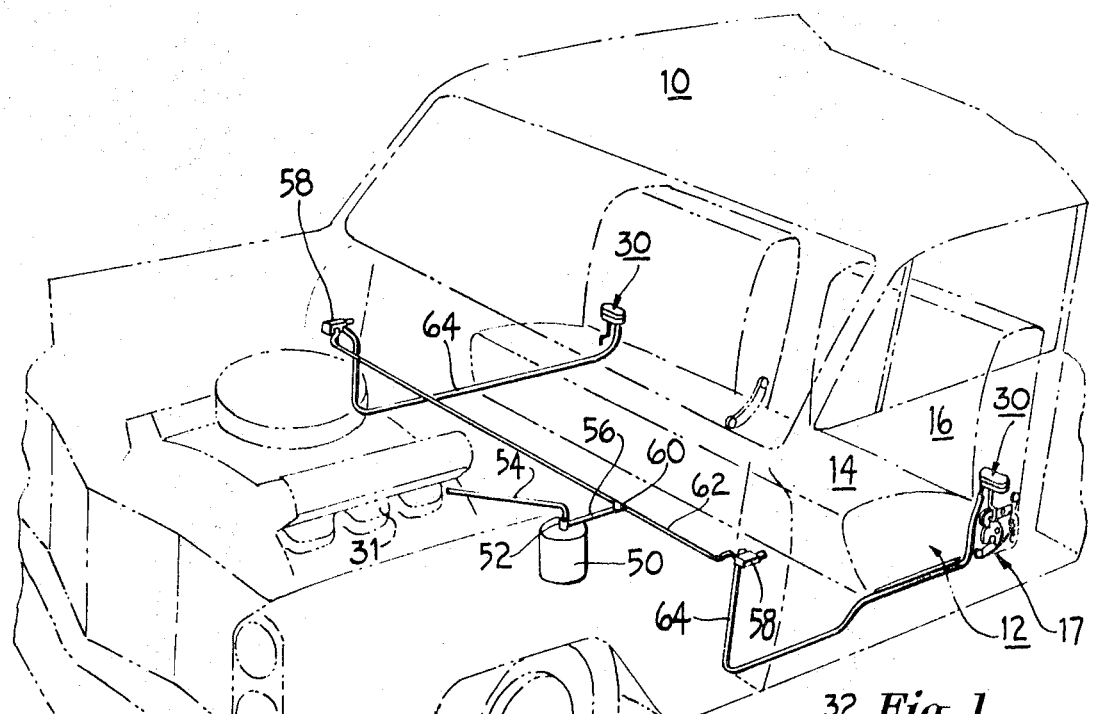
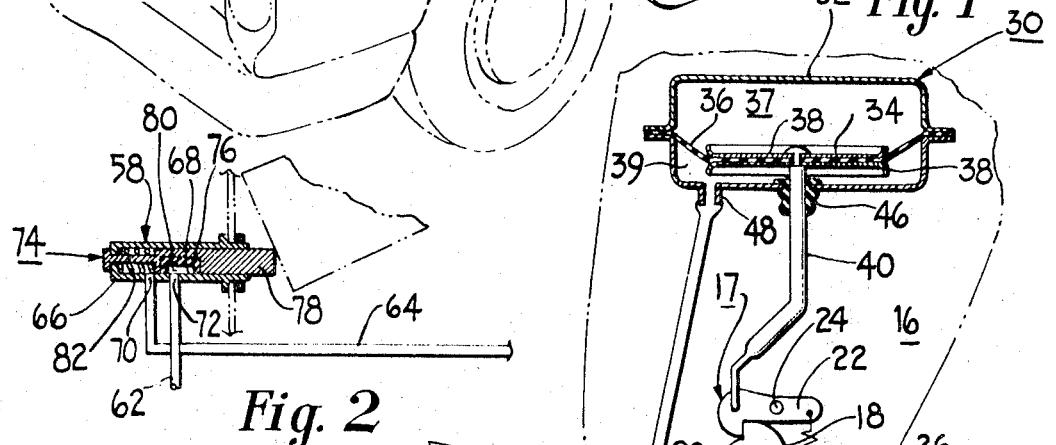
Fig. 2
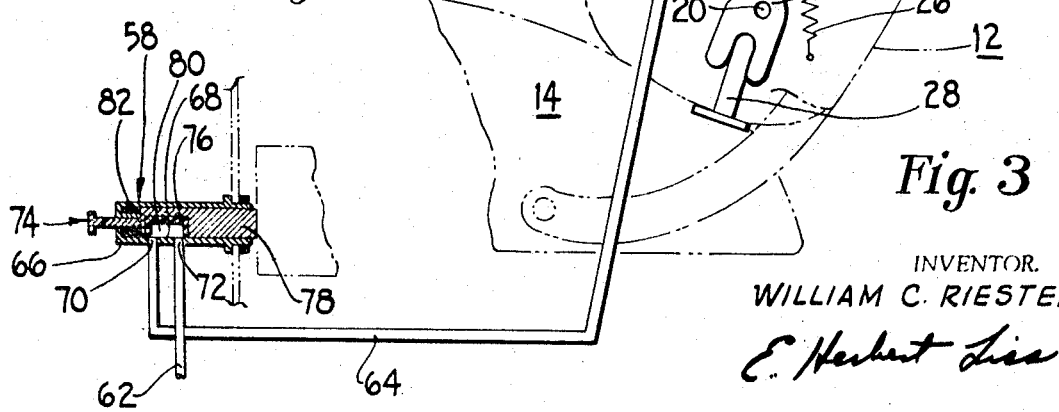
Fig. 3
INVENTOR.
WILLIAM C. RIESTER
ATTORNEY.

INVENTOR.
WILLIAM C. RIESTER

*E. Herbert Liss*
ATTORNEY.

LATCH RELEASE SYSTEM

This is a division of application Ser. No. 662,934, filed Aug. 24, 1967, now U.S. Pat. No. 3,516,704.

BACKGROUND OF THE INVENTION

The present invention relates to folding seat latch actuators for motor vehicles and, more particularly, to a remotely controlled automatic latch release system.

In two-door model automobiles it is conventional to provide front seats in which the back portion of the seat pivots forwardly to permit entry and egress to and from the rear seat of the vehicle. To improve passenger safety by preventing inadvertent forward pivoting of the seat back as, for example, during a sudden stop, latches have been provided to prevent pivoting at undesired times. These latches introduce some inconvenience because during entry and egress to the rear seats, the latch must be manually released to permit pivoting of the seat back. If the entering passenger has his hands otherwise occupied, it is difficult to manipulate the latch release. Furthermore, in darkness it is sometime a problem to locate the latch release lever. A manual-release-type latch may also present a safety hazard in case of accident; passenger exit may be delayed because of difficulty in locating and releasing such a manually releasable latch. The remotely controlled automatic latch release of this invention overcomes the above-mentioned problems.

SUMMARY

A servo unit having an operating rod operatively connected to a release pawl of a seat latch mechanism is provided. The servo unit may be connected through an energizing conduit to a control valve which may be mechanically or electrically operated. The servo unit is preferably operated by a fluid pressure differential across a diaphragm, a valve controls the supply of fluid pressure here illustrated as negative fluid pressure or vacuum. The valve assembly includes an actuator and in one form may be a door-operated pushbutton installed in the door frame. In another form the valve actuator may be a solenoid which can be operated by a pushbutton switch installed in the door frame and operated by opening and closing of the door. The pushbutton switch conventionally used for operating the courtesy light or dome light conventionally installed within an automobile may be utilized for this purpose. Thus, operation of the pushbutton switch in the door frame simultaneously operates the solenoid valve and the courtesy light, the courtesy light and solenoid being in parallel circuits. Since a manual light switch is switch is usually provided for the courtesy lights in addition to a door switch, a diode is provided in circuit with the manual switch to prevent energization of the solenoid when the courtesy lights are energized with a manual switch. The pneumatic latch release servosystem may be supplied by a fluid pressure source such as manifold vacuum in combination with a vacuum storage tank. A closed pressure system utilizing a door-actuated bellows-type pump may also be employed, thus obviating the need for a control valve.

The principal object of the present invention is to provide an automatically operable remotely controlled latch system for foldable seats in a motor vehicle.

A further object of the invention is to provide a remotely controlled automatically operable latch release system for foldable seats in a motor vehicle in which the latch release is responsive to operation of a movable member in the vehicle.

Other objects and advantages of the invention will be apparent from the following description taken in connection with the accompanying drawings.

BRIEF DESCRIPTION OF THE DRAWINGS

FIG. 1 is a schematic diagram of one form of the invention embodied in a motor vehicle shown in the perspective;

FIG. 2 is a partial sectional view of the valve with the door open;

FIG. 3 is a schematic view showing parts in section with the door closed.

DESCRIPTION OF THE PREFERRED EMBODIMENTS

Figure 4:
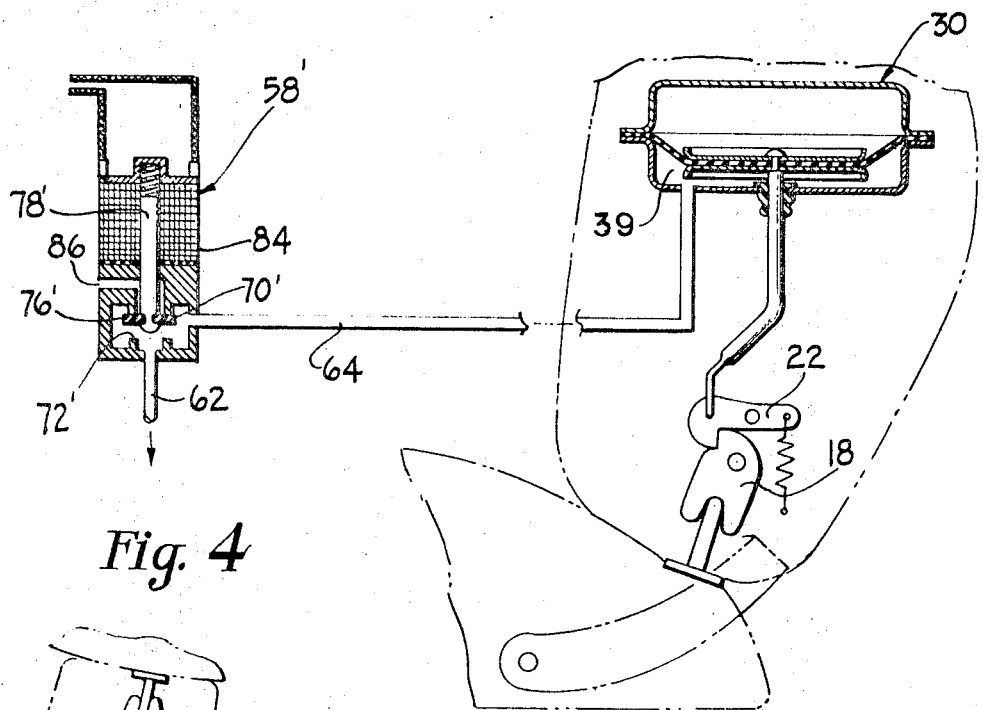
FIG. 4 is a view similar to FIG. 3 of another form of the invention.

In FIG. 1 there is shown a motor vehicle 10 embodying the invention. The motor vehicle includes a seat assembly 12 comprising a seat 14 and a seat back 16. Secured to the frame (not shown) of the seat back 16 is a latching assembly 17 including a latch 18 pivoted at 20 and a pawl 22 pivoted at 24 for retaining the latch 18 in latched position. A pawl spring 26, according to the embodiment shown in FIGS. 1 to 3, biases the pawl to released position. Secured to the seat 14 is a keeper 28 positioned for engagement with a notch in the latch 18. The latching assembly retains the seat securely against pivotal movement for the safety of the occupants in case of a sudden stop or collision. For automatically actuating the seat release to permit entry to the rear seats of the vehicle without manual manipulation of the latch, there is provided a servo unit 30, here shown as a pressure-differential-actuated unit, activated by vacuum from a suitable source, as for example an intake manifold 31 associated with the vehicle engine.

The servo unit 30 comprises a housing 32 divided into compartments 37 and 39 sealed from each other by a movable wall assembly 34. The movable wall assembly 34 includes a flexible diaphragm 36 of elastomeric material disposed between a pair of diaphragm plates 38 of rigid material. Secured substantially centrally to the movable wall assembly 34 is an operating rod or shaft 40 which extends through a grommet 46 disposed in an end wall of the housing 32. The grommet provides a seal at the shaft 40. A nipple 48 communicates with the compartment 39. When vacuum is supplied through nipple 48 to compartment 39, the latch pawl 22 is held in position to retain the latch in latching position. When the compartment 39 is vented, the pressure differential across the movable wall is neutralized; the pawl spring 26 then trips the latch to effect release. The pawl spring 26 is here shown as a tension spring for purposes of illustration and diagrammatically, but it will be understood of course that any suitable pawl-biasing means may be used as, for example, a torsion spring. Other suitable biasing means as, for example, inherent biasing means in the servo unit 30 may be employed to bias the pawl 22 through the operating rod 40.

A pneumatic system for activating the servo unit 30 comprises the vacuum source, herein shown as manifold 31, and a vacuum storage tank 50 connected to the manifold through a check valve 52 and a conduit 54. The source comprising the manifold 31 and the storage tank 50 operates the system through a conduit 56. If the vacuum pressure in the manifold 31 is greater than the vacuum pressure in the storage tank 50, vacuum is drawn directly through the manifold 31, conduit 54 and conduit 56. If the vacuum pressure in the storage tank 50 is greater than the manifold vacuum pressure, vacuum is drawn from the storage tank through conduit 56. Conduit 56 communicates with a controller 58 at each door frame through a tee 60 and a conduit 62. The controllers 58 communicate with compartment 39 of each of the servo units 30 through a conduit 64 and nipple 48.

In the embodiment shown in FIGS. 1 to 3, the controller comprises a slide valve actuated by opening and closing of a vehicle door. The controller of slide valve 58 comprises a valve body 66 having a valve seat 68 with a pair of openings 70 and 72. Opening 70 is connected through conduit 64 to the servo unit 30 and opening 72 is connected through conduit 62 to the vacuum source. Disposed in the valve body 66 is a slide valve assembly 74 comprising a slide valve 76 and a valve retainer 78. The valve 76 has a recess 80 which in one position of the valve assembly 74 straddles the openings 70 and 72 and in another position embraces the opening 72 alone while the opening 70 communicates with atmosphere through an opening in the end of valve body 66.

The controller valve body 66 is mounted in the door frame of the vehicle and the valve retainer 78 projects outwardly therefrom to engage and be actuated by the forward edge of the door. When the door is closed (FIG. 3), the valve retainer 78 is depressed within the controller value body 66. A spring 82 is provided adjacent the closed end of the controller valve body 66 to bias the valve retainer 78 outwardly when the door is opened (FIG. 2) and out of engagement with the valve retainer 78. Projecting through an opening in the closed end of the controller valve body 66 is a radially extending shoulder which engages the end of the valve body 66 to prevent the valve retainer 78 from escaping from the valve body 66.

The operation of the system should now be apparent. When the front door of the motor vehicle 10 is closed (FIG. 2), the valve retainer 78 is depressed within the valve body 66 and the slide valve 76 straddles the openings 70 and 72, effecting communication between the vacuum source, intake manifold 31 or tank 50, and compartment 39 of servo unit 30. The pressure differential resulting from the vacuum drawn in compartment 39 causes the diaphragm assembly 34 of servo unit 30 to be drawn downwardly, as viewed in FIG. 3, which in turn retains the pawl 22 in engagement with the latch 18 in opposition to the spring 26. The seat back then is firmly latched to prevent relative pivotal motion between the seat and the seat back.

When the door is opened (FIG. 3), the spring 82 causes the valve 76 and valve retainer 78 to move outwardly to the position shown in FIG. 2, thereby venting compartment 39 through conduit 64 and closing the vacuum source to thereby neutralize the pressure differential across the diaphragm assembly 34. The pawl is then biased to released position, permitting the latch 18 to pivot on its axis 20, thereby permitting the seat back 16 to pivot relative to the seat 14 so that passengers may enter the back seat.

A modified system is shown in FIG. 4 wherein a solenoid valve 58' constitutes the controller. The solenoid valve may be in circuit with the ignition or may be energized through a switch actuated by the gearshift lever. The circuit may also be energized through a switch on the gearshift lever or other movable part and through the ignition switch in parallel. The solenoid valve 58' is connected to the source through conduit 62 and to compartment 39 of servo unit 30 through conduit 64. It includes a valve 76' and valve stem 78 serving as an armature actuated by energization of coil 84. The valve 76' moves between valve seats 70' and 72' and is biased to seat 72'. When the solenoid valve 58' is energized, conduits 62 and 64 are placed in communication ro permit vacuum flow to compartment 39 of servo unit 30. When the solenoid valve is not energized, conduit 64 is placed in communication with atmosphere through vent 86 of the solenoid valve. Thus, when the solenoid valve is energized, vacuum is applied to the servo unit 30, thereby retaining the pawl 22 in position to maintain the latch 18 in latched position. When the solenoid valve is not energized, compartment 39 of servo unit 30 is vented through conduit 64 and vent 86, thereby releasing the latch pawl 22.

Assuming, then, that the solenoid coil 84 is in circuit with the ignition switch, when the ignition switch is on, the coil 84 is energized thereby permitting vacuum from the source to be applied to compartment 39 of servo unit 30 maintaining the latch in operative condition. When the ignition switch is off, the coil 84 is deenergized thereby tripping pawl 22 to release latch 18. If the coil is in circuit with the switch on the gearshift lever, the coil 84 would be energized when the gearshift lever is placed in any drive position, thereby maintaining the latch operative and would be deenergized when the gearshift lever is moved to park or neutral, thereby tripping the pawl and releasing the latch to permit folding of the seat and entry of passengers to the rear. If the coil 84 were in circuit with both the gearshift lever switch and the ignition switch in parallel, it would be necessary then for the gearshift lever to be in park or neutral position and the ignition switch to be off in order to release the latch.

Figure 5:
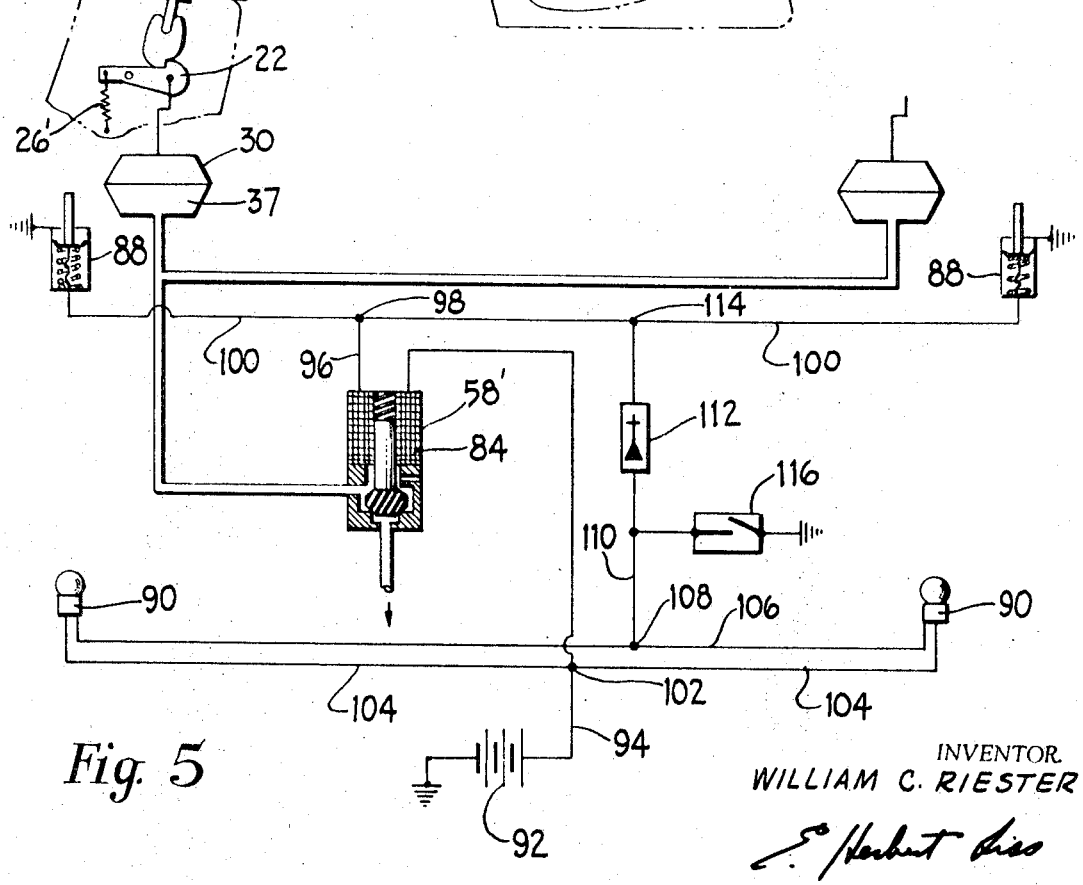
FIG. 5 is a schematic view of the FIG. 4 embodiment of the invention.

Another embodiment of the invention is shown in FIG. 5 wherein the controller is again a solenoid valve 58', identical with the solenoid 58' in the FIG. 4 modification. In this modification the solenoid is energized through a pair of parallel connected, door actuated switches 88 which also operate the usual courtesy lights 90 for lighting the interior of a motor vehicle when the door is open. switches 88 are closed and when the door is closed, switches 88 are opened. When the switches are closed the coil 84 is energized from battery 92 through lead 94, coil 84, lead 96, junction 98 and leads 100, thereby applying vacuum to compartment 37 of servo unit 30. In this embodiment the pawls 22 are biased to latching position by spring 26' or an equivalent biasing means and are drawn to released or tripped position by applying vacuum to compartment 37 of servo unit 30. Thus, when the doors are open and the switch 88 is closed, the pawl is tripped to release the latch to permit persons to enter the rear of the vehicle. The courtesy lights are also energized through battery 92, conductor 94, junction 102, leads 104, leads 106, junction 108, lead 110, diode 112, junction 114, leads 100, switches 88 to ground.

It is usual to provide a manual switch for operating courtesy lights in addition to the door switch so that the courtesy lights 90 can be employed if the door is opened or closed. For this purpose switch 116, connected in parallel with the door switches 88 and across diode 112, is provided to prevent actuation of the seat back release pawl 22 when the courtesy lights 90 are turned on manually by switch 116. The diode 112 is utilized to block energization of coil 84 through the manual switch 116.

Figure 6:
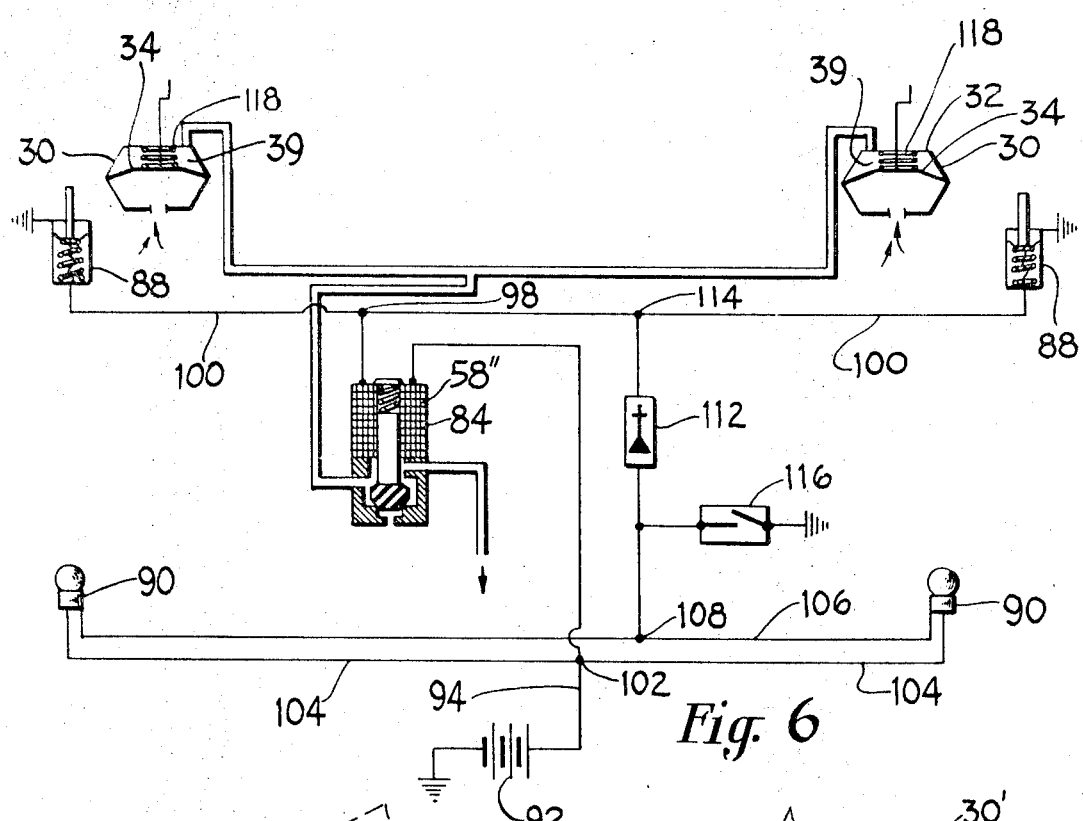
FIG. 6 is a schematic view of another modification of the invention.

A modification of the FIG. 5 embodiment is shown in FIG. 6 wherein the electrical circuitry is identical. However, a solenoid valve 58'' is utilized which permits communication of vacuum from the source to the servo unit when the solenoid coil 84 is deenergized and vents the servo unit when the coil 84 is energized. Therefore, the pawl is biased to released position as shown in FIG. 3. When the doors are open the switches 88 are closed. The solenoid is energized and the latch is released by venting of compartment 39 through the energized solenoid valve. The biasing is provided by a spring 118 in the servo unit 30 acting between the diaphragm assembly 34 and the end wall of the servo unit body 32.

Figure 7:
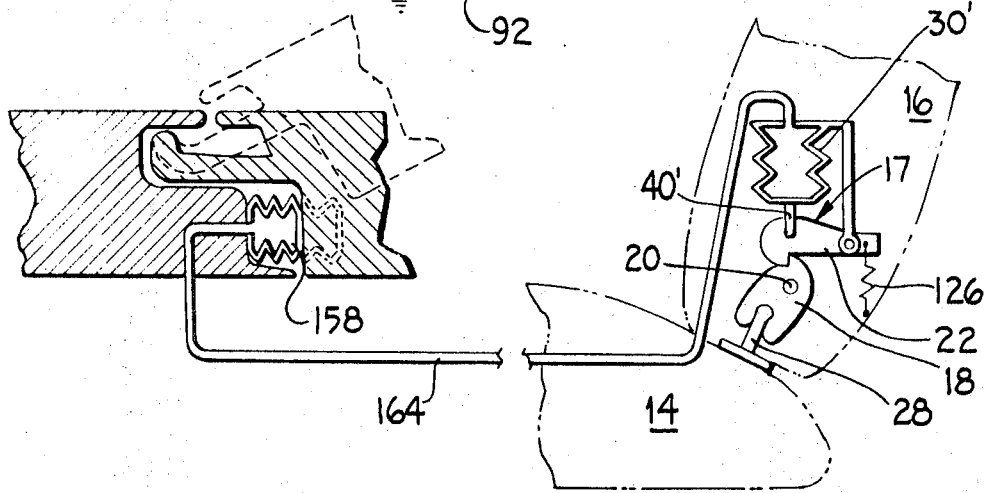
FIG. 7 is a schematic view of still another modification of the invention.

Another embodiment of the invention is shown in FIG. 7. The FIG. 7 embodiment utilizes a latch assembly 17 identical to the latch assembly illustrated in FIG. 3. However, the servo system is a closed pressure system utilizing a bellows type servo unit 30' having an operating rod 40'. A bellows 158 constituting a pressure source and control is mounted in the door frame and the control 158 is connected to the servo unit 30' through a conduit 164. The bellows control 158 extends into the space between the door and the door frame so that when the door is closed, the bellows 158 is depressed, acting as a pump, thereby pressurizing servo unit 30' to extend the bellows servo unit 30'. This maintains the pawl in latching position against the bias of spring 26. When a door is opened, the bellows control 158 expands, neutralizing or relieving the pressure in bellows servo unit 30, permitting biasing spring 126 to trip pawl 22 thereby releasing the latch, permitting folding of the seat and entry of persons to the rear of the motor vehicle.

Although certain specific embodiments of the invention have been shown and described for the purpose of illustration, it will of course be apparent that various modifications and other embodiments are possible within the scope of the invention. It is to be understood therefore that the invention is not limited to the specific arrangements shown, but in its broadest aspects it includes all equivalent embodiments and modifications which come within the scope of the invention.

I claim:

1. In a motor vehicle including a direct-current-energized element, seating means comprising a seat and seat back pivotable relative to said seat and latching means for preventing said seat back from pivoting relative to said seat, said latching means including a latch and keeper; a remotely controlled system for actuating said latch comprising a servo unit operatively connected to said latch for controlling latching and unlatching, direct current electrically actuated control means for effecting actuation of said servo unit, first switch means responsive to movement of a movable member of said motor vehicle for connecting said direct current electrically energized element and said control means to a D.C. power source, simultaneously, second switch means in parallel with said first switch means for connecting said element to a source of DC power independently and means for isolating said control means from said DC power source when said second switch means is closed.

2. A remotely controlled system according to claim 1 wherein said servo unit includes a movable wall responsive to a pressure differential thereacross and said control means is a solenoid operated valve for controlling flow from a fluid pressure source to said servo unit.

3. A remotely controlled system according to claim 2 wherein said direct-current-energized element comprises a light and wherein said first switch means is disposed in a door frame and is closed when said door is opened.

4. A remotely controlled system according to claim 3 wherein said second switch means is a manually operated switch.

5. A remotely controlled system according to claim 4 wherein said means for isolating said control means comprises a rectifier in circuit with said manual switch.

P,-1050
(5/69)

UNITED STATES PATENT OFFICE
CERTIFICATE OF CORRECTION

Patent No. 3,575,462         Dated April 20, 1971

Inventor(s) William C. Riester

It is certified that error appears in the above-identified patent and that said Letters Patent are hereby corrected as shown below:

Column 1, line 21, change "sometime" to --sometimes--. Colu 1, line 48, change "switch is switch is" to --switch is--. Column 4, line 9, change "open. switches" to --open. When door is open,--.

Signed and sealed this 21st day of December 1971.

(SEAL)
Attest:

EDWARD M. FLETCHER, JR.        ROBERT GOTTSCHALK
Attesting Officer               Acting Commissioner of Patent